United States Patent Office 2,967,812
Patented Jan. 10, 1961

2,967,812
NEUTRONIC REACTOR FUEL COMPOSITION

William C. Thurber, Oak Ridge, Tenn., assignor to the United States of America as represented by the United States Atomic Energy Commission No Drawing. Filed Jan. 31, 1958, Ser. No. 712,599

11 Claims. (Cl. 204—193.2)

My invention is related generally to the metallurgy art and more particularly to a novel composition of matter which is particularly useful in neutronic reactors.

As a neutronic reactor operates, the fissionable fuel contained therein is constantly being depleted. Upon sufficient depletion of fuel, there is ultimately reached a point at which the effective multiplication factor of the neutron reactive system falls below the critical value of one, thereby placing the neutron reaction in a state of convergency which will effectively result in the termination of the chain reaction. In order to delay this event and prolong the operating lifetime of a neutronic reactor, it is necessary to initially build excess reactivity into the neutron reactive system.

With a multiplication factor in excess of one, the neutron reaction becomes exponentially divergent; therefore, means must be supplied to "hold out" or cancel the reactivity in excess of the necessary amount required for self sustenance of the chain reaction at steady state. The cancellation of reactivity is usually accomplished in thermal reactors by incorporating, either permanently or temporarily, a neutron absorbing material such as boron within the reactor active portion.

The classical method of cancellation has been the temporary insertion of regulating rods and shim rods, which contain a neutron poison, into the active portion of the neutronic reactor. As the reactivity of the reactor declines as a result of the buildup of deleterious fission products and depletion of fissionable fuel, the shim rods are withdrawn, thereby compensating for the decrease in the reactivity of the system.

Permanent incorporation of a burnable neutron poison in the active portion of a neutronic reactor is an innovation more recent than the temporary insertion of rods described above. This technique comprises the dispersion of a burnable neutron absorber throughout the active portion. If the increase in reactivity, due to burn-up of the absorber exactly compensates the decrease in reactivity caused by the buildup of deleterious fission products and depletion of fuel, then the neutronic reactor into which the absorber is permanently incorporated, is a self-governing mechanism. Permanent incorporation of a burnable poison is the safest technique in that it can eliminate the possibility of a sudden exponential rise in reactivity, sufficient to place the reactor in a state of prompt criticality, through an inadvertent withdrawal of shim control.

Boron is an attractive material for use as a burnable poison. Boron[10], which has an absorption cross section of approximately $4 \times 10^3$ barns, undergoes the following reaction with a neutron:

$$_5B^{10} + _0N^1 = _3Li^7 + _2He^4$$

Li[7] and He[4] are materials which have low absorption cross sections for thermal neutrons; therefore, the above reaction provides a method for reducing, as a consequence of reactor operation, the concentration of a neutron poison in any neutron reactive system, thus allowing the effective multiplication factor to remain at a value near unity, even though fuel is being consumed.

The most prevalent thermal reactors today are the research reactors which use the plate-type fuel assemblies such as are found in the Materials Testing Reactor (MTR). This reactor is disclosed in the co-pending application of the common assignee Serial No. 360,190, filed June 8, 1953, now Patent No. 2,832,732, issued April 29, 1958, in the name of Eugene P. Wigner for "Neutronic Reactor." The method of fabricating the plate-type fuel element is described in the Geneva Conference paper "MTR Type Fuel Elements," by J. E. Cunningham and E. J. Boyle, a/Conf. 8/P/953, July 6, 1955. Since the plate-type fuel element is in such widespread use, the adoption of the burnable poison method of shim control to this fuel is a very desirable end, but in the prior art it was impossible to produce a fuel element containing an absorber such as boron dispersed homogeneously throughout the uranium-aluminum alloy. Homogeneity of a burnable poison in the fuel is essential because "hot spots" or areas of extreme overheating are encountered in a non-homogeneous fuel as it undergoes fission. In addition, a non-homogeneous alloy is very difficult to analyze for neutron-absorbent content.

The obvious additives for the purpose of introducing boron into uranium-aluminum alloys are the various aluminum-boron compositions that are available. Unfortunately, under investigation, these compositions proved to be completely unsatisfactory, as will be illustrated later.

It is, therefore, an object of my invention to provide novel uranium-aluminum alloys containing boron dispersed therein.

Another object of my invention is to provide novel uranium-aluminum-boron type alloys for use as neutronic reactor fuels.

A further object of my invention is to provide novel boron-bearing, neutronic-reactor fuel elements.

These and other objects of my invention will become apparent to one skilled in the art from the following detailed description and the claims appended thereto.

In accordance with my invention, I provide a novel alloy which comprises uranium, aluminum, nickel, and boron.

Suitable concentrations of uranium in the alloy range from 5 weight percent to 55 weight percent; aluminum, from 43 weight percent to 94 weight percent; nickel, from 0.87 weight percent to 1.74 weight percent; and, boron, from 0.13 weight percent to 0.26 weight percent. Preferred concentrations are as follows: uranium, 13 weight percent; aluminum, 85.4 weight percent; nickel, 1.4 weight percent; and boron, 0.2 weight percent.

My novel alloy is particularly useful as a neutronic reactor fuel composition, and when utilized for reactor purposes, the alloy comprises uranium, aluminum, and a relatively minor amount of a nickel-boride composition. In this form the boron is homogeneously dispersed throughout the fuel, thereby providing means for convenient reactor shim control through utilization of the boron as a burnable poison.

The term "boron," as used herein, is defined as naturally occurring boron in the elemental state containing 18.8 percent B[10]. All preferred concentrations given below are based on this composition and preferred concentrations for boron either enriched or depleted in the B[10] isotope may be readily calculated by those skilled in the art.

The term "nickel-boride composition," as used herein, is defined as the product of a molten mixture of nickel and boron.

The term "uranium," as used herein, is defined as being essentially a mixture of $U^{238}$ and $U^{235}$, the ratio of $U^{235}$ to $U^{238}$ being a variable.

The aluminum concentration in the alloy is not particularly critical and is dependent upon the uranium concentration, but it has been found that the mechanical and fabricational properties of the alloy are best when the aluminum concentration is maintained within the concentration range of 43 weight percent to 94 weight percent. For ease of fabrication of plate-type fuel elements it is preferable to maintain the concentration at 85.4 weight percent.

The concentration of uranium in the alloy which I provide depends upon the degree of enrichment with respect to the $U^{235}$ isotope and the nuclear characteristics of the reactor in which the alloy is destined to be used. Suitable concentrations of uranium range from 5 weight percent to 55 weight percent and for ease of fabrication of plate-type elements it is desirable to maintain the concentration at 13 weight percent.

The highest tolerable concentration of the nickel-boride composition, if dispersed in all fuel elements in a nuclear reactor, is that concentration at which an effective multiplication factor of at least unity is unobtainable in a neutron reactive system of practical size. This value is dependent upon many variables, such as $U^{235}$ concentration, moderator composition, purity of the materials of construction, and the degree of dependence of reactivity upon temperature, but may be computed for each reactor design. The lower concentration limit is, in an analogous manner, any concentration greater than would normally be present by reason of impurities in the uranium and aluminum. Of course, if my composition is used in just a few of many fuel elements within a reactor core to suppress flux peaks, there is, essentially, no limit to the nickel-boride concentration. Suitable nickel-boride concentrations for most research reactors utilizing plate-type fuel elements are within the concentration range of 1 weight percent to 2 weight percent and it is preferable to maintain the concentration at approximately 1.6 weight percent.

Any concentration of boron in the nickel boride composition is suitable, but it is preferable to maintain the concentration between 10 weight percent and 20 weight percent boron to take advantage of the low melting point of these compositions. The 13 percent eutectic composition is particularly desirable because of its low melting point and is, therefore, preferred.

Nickel-boride compositions may be prepared in any convenient manner. I have found it suitable to arc-melt cold-pressed and sintered compacts of the elemental powders. The product of this method of preparation is extremely brittle and can be broken into small pieces for alloying with uranium and aluminum.

The uranium-aluminum-nickel-boron alloy may be prepared in any convenient manner, but I have found it preferable to melt the necessary amounts of the nickel-boride composition and aluminum in a graphite crucible heated in an open air induction furnace. After the melt has reached the melting point of the nickel-boride composition, the required amount of uranium is added and the resulting mixture heated to insure complete dissolution. This casting practice will be more fully set forth in the example appearing below.

For purposes of comparison of my invention with the aluminum-boron compositions mentioned earlier, an empirical rating scheme was devised, as is evident from Table I below. The term "recovery percent," which appears in column two of Table I, is defined by the following ratio:

$$\text{Recovery percent} = \frac{\text{mean analyzed boron content}}{\text{intended boron content}} \times 100$$

The recovery percent is a measure of yield and it is not necessary that it be high, although a high value is desirable. The recovery, as between castings, should, however, be consistent and wide deviations from a mean value are intolerable. The term "index of homogeneity," which appears in column 4 of Table I below, is defined by the following ratio:

$$\text{I of H} = 100 - \frac{\text{average absolute deviation of each determination from mean boron content}}{\text{mean analyzed boron content}}$$

Absolute values of the index of homogeneity are extremely important, and for neutronic reactor fuel purposes, the index must be greater than 82, with an index of 100 being that of an unsegregated material. Table I displays the results of an investigation of boron additives and affords a comparison of my invention with various aluminum-boron compositions. Each value in Table I represents an average of the results of at least five castings.

TABLE I

| Type of Boron Additive | Average Recovery, Percent | Greatest Deviation From Average Recovery, Percent | Average Index of Homogeneity, percent |
|---|---|---|---|
| 1. $AlB_{12}$ | 48 | 94 | 54 |
| 2. Arc-melted Al-B alloys of various boron content | 68 | 47 | 79 |
| 3. Nickel-Boride Compositions | 88 | 6 | 88 |

An inspection of Table I reveals that the aluminum-boron compositions displayed intolerable variations in recovery, and low indices of homogeneity. The nickel-boride compositions, however, yielded a remarkably low recovery variation, while simultaneously having an average index of homogeneity of 88, which is well above the crittical value of 82.

As illustrative of one manner in which my alloy may be successfully prepared, the following example is offered.

*Example 1*

29.6 grams of a nickel-boride composition (13% boron) and 1492 grams of aluminum are melted in a graphite crucible heated in an open-air induction furnace. After the melt has attained a temperature of 900° C., 228 grams of uranium metal, enriched to ~90% in the $U^{235}$ isotope, are added, and the resulting mixture is heated to 1075° C., to insure complete dissolution. The melt is cooled to 900° C. and poured into a graphite mold, having a trapezoidal feeding head and approximate dimensions as follows: height, 10½ inches; width, 3 inches; thickness, ⅞ inch. Upon cooling, there results a casting which weighs approximately 1750 grams and displays an index of homogeneity of 92 and a recovery of 90 percent. The resultant casting is heated to approximately 600° C. and hot-rolled to a thickness of 0.250 inch. Fuel cores 2.0 inches by 2.3 inches are punched from the rolled casting and enclosed by the "picture frame" technique, thereby forming a composite plate assembly. The composite assemblies are hot-rolled, flux-annealed, and cold-rolled to final thickness. A final machining yields plates which are assembled into MTR-type fuel elements.

The above-outlined fabrication process is fully described in the co-pending application of the common assignee Serial No. 683,192, filed September 10, 1957, now Patent No. 2,950,188, issued August 23, 1960, in the names of Marion L. Pickelsimer and William C. Thurber for "Uranium-Aluminum Fuel Alloy Containing Silicon." The resultant fuel elements can be substituted for the fuel elements of the Materials Testing Reactor (MTR) and criticality achieved, if at least a portion of the present MTR shim control is held out of the reactor active portion.

The above description of my invention as it relates to the neutronic reactor art was given merely for illustrative purposes and should not be interpreted as imposing limitations on my invention. Many changes and modifications can be made within the scope of my invention, and such changes and modifications will be completely obvious to those skilled in the art, in view of my herein contained description. For example, my novel composition is satisfactory for use as a reactor fuel without a cladding in some neutronic reactor applications. Boron concentrations within either the fuel composition or the nickel-boride composition may differ from the preferred ranges which I have set forth, if such fuel elements are required for special reactor uses. My fuel composition can be fabricated into various geometrical shapes such as rods, plates, pins, cylinders, and the like, the particular geometric shape being at the discretion of the reactor designer. Accordingly, my invention should be limited only as indicated in the appended claims.

Having thus described my invention, what is claimed is:

1. A novel alloy consisting essentially of 5 to 55 weight percent uranium, 43 to 94 weight percent aluminum, 0.87 to 1.74 weight percent nickel, and 0.13 to 0.26 weight percent boron.
2. The alloy of claim 1 wherein the boron concentration is 0.2 weight percent.
3. The alloy of claim 2 wherein the nickel concentration is 1.4 weight percent.
4. In a neutronic reactor fuel composition consisting essentially of aluminum, uranium, and boron as a burnable poison, the improved composition in which boron is dispersed as a nickel boride.
5. The improved composition of claim 4 in which the concentration of nickel boride is within the range of 1–2 weight percent.
6. The improved composition of claim 5 in which the concentration of boron in said nickel boride is within the range of 10–20 weight percent.
7. The improved composition of claim 5 in which the concentration of boron in said nickel boride is 13 weight percent.
8. In a neutronic reactor fuel element comprising an inner fuel core and an outer aluminum cladding completely surrounding said inner core, said inner core consisting essentially of aluminum, uranium, and boron as a burnable poison, the improved inner core composition in which boron is dispersed as a nickel boride.
9. The improved inner core composition of claim 8 in which the concentration of nickel boride is within the range of 1–2 weight percent.
10. The improved inner core composition of claim 9 in which the concentration of boron in said nickel boride is within the range of 10–20 weight percent.
11. The improved inner core composition of claim 9 in which the concentration of boron in said nickel boride is 13 weight percent.

References Cited in the file of this patent

UNITED STATES PATENTS

| | | |
|---|---|---|
| 1,304,224 | Vogt | May 20, 1919 |
| 1,415,733 | Thofehrn | May 9, 1922 |
| 2,185,348 | Mansfield | Jan. 2, 1940 |
| 2,798,848 | Kingdon | July 9, 1957 |
| 2,799,642 | Hurwitz et al. | July 16, 1957 |

OTHER REFERENCES

NMI–2064, Dec. 18, 1957, classified AEC report, availble from AEC.

Reactor Core Materials, August 1958, vol. 1, No. 3, pp. 7 and 22. Available from U.S. Gov't Printing Office, Washington 25, D.C.